US005435190A

United States Patent [19]

Jansson et al.

[11] Patent Number: 5,435,190

[45] Date of Patent: Jul. 25, 1995

[54] TOOL WITH MOMENT INDICATION

[75] Inventors: Conny Jansson, Enköping; Håkan Bergqvist; Hans Himbert, both of Bromma, all of Sweden

[73] Assignee: Sandvik AB, Sandviken, Sweden

[21] Appl. No.: 211,810

[22] PCT Filed: Aug. 18, 1993

[86] PCT No.: PCT/SE93/00685

§ 371 Date: Jun. 13, 1994

§ 102(e) Date: Jun. 13, 1994

[87] PCT Pub. No.: WO94/04321

PCT Pub. Date: Mar. 3, 1994

[30] Foreign Application Priority Data

Aug. 25, 1992 [SE] Sweden .............................. 9202433

[51] Int. Cl.⁶ .............................................. G01L 5/24

[52] U.S. Cl. ................................ 73/862.23; 81/483

[58] Field of Search ...................... 73/862.21–862.23; 81/467, 477, 478, 483, 480, 481

[56] References Cited

U.S. PATENT DOCUMENTS

| | | | |
|---|---|---|---|
| 2,743,638 | 5/1956 | Woods | 81/483 |
| 2,934,985 | 5/1960 | Mutolo et al. | 81/483 |
| 3,016,773 | 1/1962 | Woods | 81/483 |
| 3,276,296 | 10/1966 | Woods | 81/467 |
| 4,467,678 | 8/1984 | Lindholm | 81/483 |
| 4,898,068 | 2/1990 | Neuhaus | 81/478 |
| 5,123,289 | 6/1992 | Potesta | 73/862.23 |
| 5,129,293 | 7/1992 | Larson et al. | 81/483 |
| 5,152,200 | 10/1992 | Kaplan | 81/467 |

*Primary Examiner*—Richard E. Chilcot, Jr.
*Assistant Examiner*—Elizabeth L. Dougherty
*Attorney, Agent, or Firm*—Burns, Doane, Swecker & Mathis

[57] ABSTRACT

A tool is provided for the exertion of a turning moment, including an indication as to whether the turning moment exceeds a set value, in which a form piece (4) with parallel rectangular surfaces turns when the turning moment attains the set value and pushes a press bolt (3) situated in the shaft (2) and a indication sleeve (6) situated outside the shaft, said indication sleeve being connected with the press bolt, towards the grip (11) so that a previously hidden part of the indication sleeve (6) with a contrasting color becomes visible.

8 Claims, 1 Drawing Sheet

TOOL WITH MOMENT INDICATION

BACKGROUND OF THE INVENTION

Tools for the rotation of screws, nuts and other threaded objects are often provided with a moment measuring or moment indicating appliance in order to guarantee that the tightening moment be within a prescribed range, since too low a moment does not give a tight joint and too high a moment damages the threaded object. Also for other tools intended for exerting a turning moment, there is a need for measuring or indicating the magnitude of the turning moment, e.g. when controlling the turning moment in springs, axles or bolts.

Basically, there exist two different types of tools. When using a moment measuring tool, the moment is determined as a deformation in some part of the tool, for instance in an elastic joint or in the shaft as such and the deformation can be read by an index on a scale or by digital electronics. However, the reading requires that the tool be moved slowly and that the scale be clearly visible, wherefore this type is unsuitable for routine installation work. Moment indicating tools merely indicate whether the moment is above or underneath an initially determined value, and is faster to work with when many screws are to be tightened with the same moment.

When using moment indicating tools, the difficulty resides in achieving an indication which is easily readable also under difficult conditions with noise and bad visibility. The invention foresees a tool with which the indication is effected in several simultaneous ways.

BRIEF DESCRIPTION OF THE DRAWING

One embodiment of the present invention is a ratchet handle which is partially shown in a cross-section in FIGS. 1 and 2, in which.

DETAILED DESCRIPTION OF PREFERRED EMBODIMENTS

Figures 1, 2:
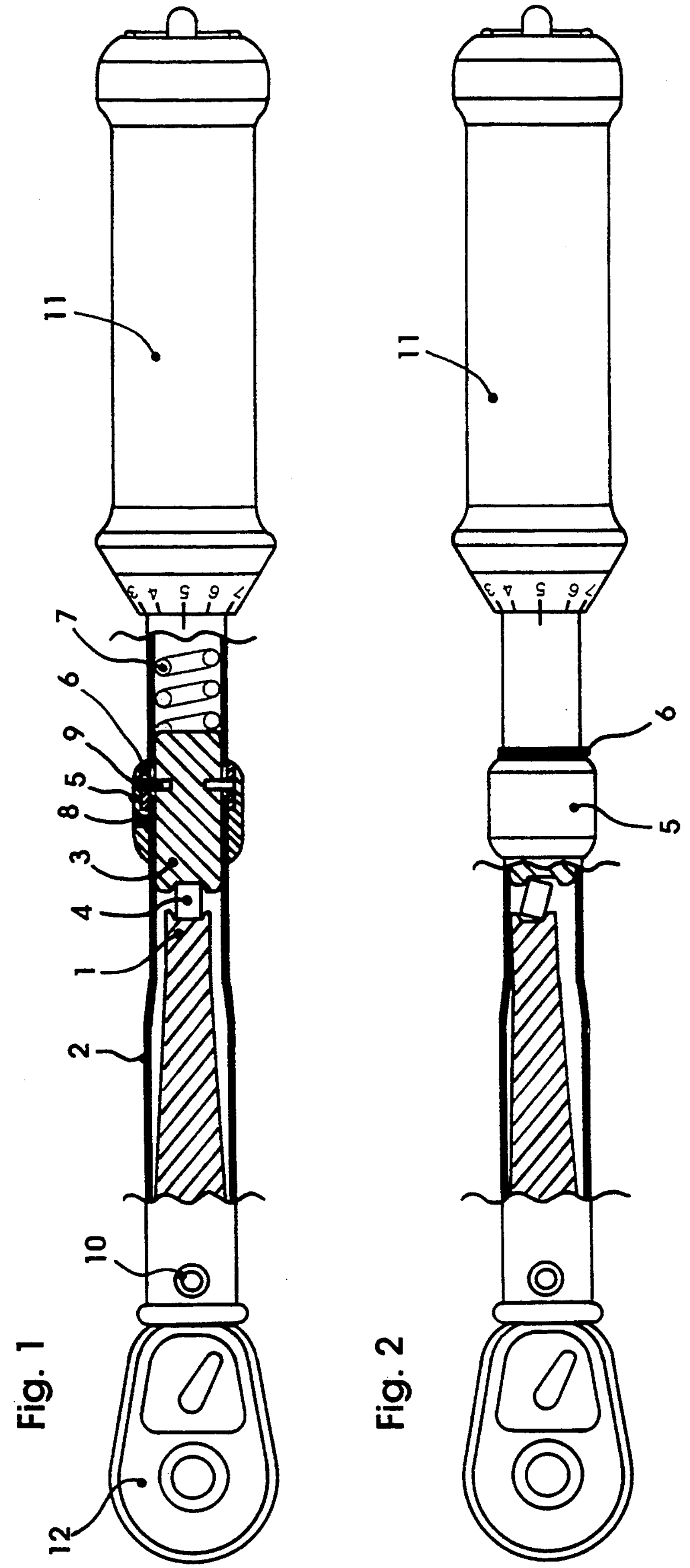
FIG. 1 shows the position of the separate parts when the moment is less than the set value.
FIG. 2 shows the position of the different parts when the moment exceeds the set value.

A ratchet handle according to the present invention includes a grip 11, a hollow shaft 2 and a head 12 with a protruding axle to which different sleeves can be coupled, depending on the size of the threaded objects. Preferably, the head 12 includes a stepping mechanism. The head 12 is fixedly connected to an arm 1 which protrudes into the shaft 2, the head being restricted in its angular movement in relation with the shaft tube by a joint 10. Inside the shaft 2 there is a slidable press bolt 3 which can be urged against the head 12 by a helical spring 7. By turning the grip 11, the helical spring 7 can be compressed to different extents so that the force in the helical spring is adjustable and can be read on a scale on the grip 11.

Between the arm 1 and the press bolt 3 a form piece 4 is inserted with parallel rectangular surfaces. The form piece 4 abuts plane surfaces on the arm 1 and on the press bolt 3, which surfaces are delimited by protruding edges.

The press bolt 3 is connected to a slidable indication sleeve 6 on the outside of the shaft 2 via one or several pins 9 which penetrate elongated slots in the shaft tube, the indication sleeve preferably being made with a contrasting colour over the other parts. Outside the indication sleeve 6 there is a covering sleeve 5 which is fixedly connected with the shaft 2 by one or several set screws 8.

When the moment on the axle of the head 12 gets less than a value which is dependent upon the set force in the helical spring 7, then the parallel surfaces of the form piece 4 come into contact with the plane surfaces of the arm 1 and the press bolt 3, the arm 1 being forced to a central positioning within the shaft 2, whereby the protruding edges of the plane surfaces render this central position well defined and reproducible. Thereby, the indication sleeve 6 is hidden within the cover sleeve 5.

When the moment on the axle of the head 12 exceeds the value which is dependent upon the set force in the helical spring 7, then the form piece 4 turns so that only its edges but not its parallel surfaces come into contact with the press bolt 3 and the arm 1. Then the press bolt 3 and the indication sleeve 6 move towards the grip 11. This can be observed in four different ways. The first indication is that as soon as the form piece 4 starts turning, then the movability of the shaft 2 and the grip 11 increases around the joint 10, which is sensed by the user. The second indication is that the arm 1 abuts against the inside of the shaft 2 with a hearable sound. The third and the fourth indication is that when the indication sleeve 6 moves towards the grip 11, it protrudes out of the cover sleeve 5, which is visible from many different directions by the fact that the indication sleeve has a contrasting colour, and can also be felt with a finger.

In comparison with other constructions for similar uses, the invention makes it possible to observe the attainment of the desired moment in several ways, including cases where the tool is difficult or impossible to observe. The rectangular shape of the parallel sides of form piece 4 is less submitted to wear than other known constructions, cf. for instance U.S. Pat. No. 5,123,289, because of the fact that the edges are unloaded when the set moment has not been exceeded, and also gives a better defined and play-free central positioning of the arm 1.

Ratchet handles for the rotation of threaded objects represent only one embodiment of tools according to the invention, which can also be formed for the rotation of threaded objects without any stepping function in the head 12, or for the control of torsional moments in springs, axles and bolts. The spring 7 can be a helical spring and also, e.g., one or several cup springs.

Although only preferred embodiments are specifically illustrated and described herein, it will be appreciated that many modifications and variations of the present invention are possible in light of the above teachings and within the purview of the appended claims without departing from the intended scope of the invention.

We claim:

1. A tool for the exertion of a turning moment with an indicator for showing whether the turning moment exceeds a set value, comprising:

a hollow shaft, a grip, a head at which the turning moment is exerted, a joint between the head and the shaft, an arm joined with the head and protruding into the shaft, said arm having a substantially planar surface, and a spring within the shaft, a press bolt between the arm and the spring, said press bolt is slidable in the shaft and has a substantially planar surface, and a form piece with parallel surfaces which abut the planar surfaces of the press bolt and of the arm when the turning moment is less than a set value, an indication sleeve on the outside of the shaft is connected to the press bolt, and the indication sleeve is hidden when the turning moment is less than the set value, wherein when the turning moment attains or exceeds the set value the form piece turns and contacts the planar surfaces only with its edges, displacing the press bolt and the indication sleeve along the shaft towards the grip, thus exposing a part of the indication sleeve.

2. Tool according to claim 1, wherein the part of the indication sleeve has a contrasting colour.

3. Tool according to claim 1, wherein the planar surfaces of the press bolt and the arm have protruding edges.

4. Tool according to claim 1 wherein the parallel surfaces of the form piece are rectangular.

5. Tool according to claim 1 wherein the head is provided with a protruding axle in order to couple sleeves for the rotation of threaded objects.

6. Tool according to claim 2, wherein the planar surfaces of the press bolt and the arm have protruding edges.

7. Tool according to claim 2, wherein the parallel surfaces of the form piece are rectangular.

8. Tool according to claim 2, wherein the head is provided with a protruding axle in order to couple sleeves for the rotation of threaded objects.

* * * * *